(12) United States Patent
Quach et al.

(10) Patent No.: US 11,867,402 B2
(45) Date of Patent: Jan. 9, 2024

(54) CMC STEPPED COMBUSTOR LINER

(71) Applicant: Raytheon Technologies Corporation, Farmington, CT (US)

(72) Inventors: San Quach, Southington, CT (US); Thomas N. Slavens, Norman, OK (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/207,193

(22) Filed: Mar. 19, 2021

(65) Prior Publication Data
US 2022/0299206 A1   Sep. 22, 2022

(51) Int. Cl.
| | | |
|---|---|---|
| F23R 3/42 | (2006.01) | |
| F23R 3/00 | (2006.01) | |
| F23R 3/06 | (2006.01) | |
| F02C 3/00 | (2006.01) | |

(52) U.S. Cl.
CPC .............. *F23R 3/42* (2013.01); *F02C 3/00* (2013.01); *F23R 3/002* (2013.01); *F23R 3/007* (2013.01); *F23R 3/06* (2013.01); *F05D 2220/32* (2013.01); *F05D 2240/35* (2013.01); *F05D 2300/6033* (2013.01)

(58) Field of Classification Search
CPC .. F23R 3/002; F23R 3/06; F23R 3/007; F23R 3/42; F23R 3/46; F23R 3/50
See application file for complete search history.

(56) References Cited

U.S. PATENT DOCUMENTS

| | | | | | |
|---|---|---|---|---|---|
| 2,525,206 | A | * | 10/1950 | Clarke | F23R 3/14 60/800 |
| 3,420,058 | A | * | 1/1969 | Howald | F23R 3/08 60/757 |
| 3,737,152 | A | * | 6/1973 | Wilson | F23R 3/08 60/757 |

(Continued)

FOREIGN PATENT DOCUMENTS

| | | |
|---|---|---|
| EP | 0219723 | 4/1987 |
| GB | 2298266 | 8/1996 |

(Continued)

OTHER PUBLICATIONS

Fillet (mechanics), In Wikipedia, The Free Encyclopedia. Mar. 10, 2020. Obtained from WayBackMachine.org at <https://web.archive.org/web/20200310105203/https://en.wikipedia.org/wiki/Fillet_(mechanics)> on Jul. 25, 2022 (Year: 2020).*

(Continued)

*Primary Examiner* — Alain Chau
(74) *Attorney, Agent, or Firm* — Carlson, Gaskey & Olds, P.C.

(57) ABSTRACT

In one exemplary embodiment, a combustor liner includes a first portion extending in a substantially axial direction and a second portion that extending in the substantially axial direction. A step connects the first portion and the second portion. The step is arranged at an angle to the second portion that is less than 90°. The step has a step height defined as a distance between the first portion and the second portion. The first portion, second portion, and step are formed as a unitary ceramic component. A slot extends through the step, and a ratio of a height of the slot to a height of the step is greater than 0.66.

18 Claims, 4 Drawing Sheets

(56) References Cited

U.S. PATENT DOCUMENTS

| | | | | |
|---|---|---|---|---|
| 4,077,205 A * | 3/1978 | Pane | F23R 3/08 60/757 |
| 4,206,865 A * | 6/1980 | Miller | B23P 15/00 228/152 |
| 4,242,871 A * | 1/1981 | Breton | F23R 3/08 60/757 |
| 4,302,941 A * | 12/1981 | DuBell | F23R 3/002 60/757 |
| 4,485,630 A * | 12/1984 | Kenworthy | F23R 3/002 60/757 |
| 4,622,821 A * | 11/1986 | Madden | F23R 3/002 60/757 |
| 4,655,044 A * | 4/1987 | Dierberger | F23R 3/002 60/753 |
| 4,773,227 A * | 9/1988 | Chabis | F23R 3/045 60/757 |
| 4,773,593 A * | 9/1988 | Auxier | F01D 5/184 239/127.3 |
| 5,000,005 A * | 3/1991 | Kwan | F01D 5/184 431/352 |
| 5,077,969 A * | 1/1992 | Liang | F02K 1/822 60/757 |
| 5,279,127 A * | 1/1994 | Napoli | F23R 3/06 60/754 |
| 6,021,570 A * | 2/2000 | Lockyer | F23R 3/002 29/890.01 |
| 6,079,199 A * | 6/2000 | McCaldon | F23R 3/002 60/755 |
| 6,266,961 B1 * | 7/2001 | Howell | F23R 3/06 60/752 |
| 6,397,603 B1 | 6/2002 | Edmondson et al. | |
| 6,408,628 B1 * | 6/2002 | Pidcock | F23R 3/002 60/752 |
| 6,438,958 B1 * | 8/2002 | McCaffrey | F23R 3/002 60/752 |
| 6,519,850 B2 * | 2/2003 | McCaffrey | F23R 3/002 29/890.01 |
| 6,986,201 B2 * | 1/2006 | Moertle | B23P 6/005 29/890.01 |
| 7,007,481 B2 * | 3/2006 | McMasters | F23R 3/08 60/752 |
| 7,665,307 B2 | 2/2010 | Burd et al. | |
| 7,926,278 B2 | 4/2011 | Gerendas et al. | |
| 9,476,591 B2 * | 10/2016 | Tuttle | F23R 3/343 |
| 9,651,258 B2 | 5/2017 | Graves et al. | |
| 10,794,595 B2 | 10/2020 | McKinney et al. | |
| 10,928,067 B2 * | 2/2021 | Sze | F23R 3/06 |
| 2002/0178728 A1 | 12/2002 | McCaffrey | F23R 3/002 60/752 |
| 2004/0107574 A1 * | 6/2004 | Moertle | F23R 3/08 29/890.01 |
| 2005/0050896 A1 * | 3/2005 | McMasters | F23R 3/007 60/748 |
| 2007/0283700 A1 * | 12/2007 | Gerendas | F23R 3/002 60/754 |
| 2009/0293490 A1 * | 12/2009 | Aurifeille | F23R 3/42 60/753 |
| 2009/2293490 | 12/2009 | Aurifeille | |
| 2016/0215980 A1 * | 7/2016 | Chang | F02C 7/24 |
| 2017/0059159 A1 | 3/2017 | Varney | |
| 2019/0128523 A1 * | 5/2019 | Sze | F23R 3/002 |
| 2020/0124281 A1 | 4/2020 | Dillard | |

FOREIGN PATENT DOCUMENTS

| | | |
|---|---|---|
| JP | S5179208 | 6/1976 |
| JP | S54158107 | 11/1979 |

OTHER PUBLICATIONS

Extended European Search Report for EP Application No. 22159529.1 dated Aug. 11, 2022.

* cited by examiner

CMC STEPPED COMBUSTOR LINER

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The combustor section includes a chamber where the fuel/air mixture is ignited to generate the high energy exhaust gas flow. Thus, the combustor is generally subject to high thermal loads for prolonged periods of time. Combustor liners have been proposed made of ceramic matrix composite (CMC) materials, which have higher temperature capabilities. However, CMC materials cannot tolerate the same levels of thermal gradient and strain.

SUMMARY OF THE INVENTION

In one exemplary embodiment, a combustor liner includes a first portion extending in a substantially axial direction and a second portion that extending in the substantially axial direction. A step connects the first portion and the second portion. The step is arranged at an angle to the second portion that is less than 90°. The step has a step height defined as a distance between the first portion and the second portion. The first portion, second portion, and step are formed as a unitary ceramic component. A slot extends through the step, and a ratio of a height of the slot to a height of the step is greater than 0.66.

In another embodiment according to any of the previous embodiments, the step joins the second portion at a fillet.

In another embodiment according to any of the previous embodiments, a ratio of a radius of the fillet to the step height is between 0.3 and 0.5.

In another embodiment according to any of the previous embodiments, the slot extends substantially tangentially to the second portion.

In another embodiment according to any of the previous embodiments, the slot has a diffuser portion.

In another embodiment according to any of the previous embodiments, at least one hole extends through the second portion.

In another embodiment according to any of the previous embodiments, a third portion is joined to the second portion at a second step.

In another embodiment according to any of the previous embodiments, the first portion has a first length, the second portion has a second length, and the step has a step length, and wherein the first length and the second length are at least twice the step length.

In another exemplary embodiment, a combustor assembly includes a liner arranged within a combustion chamber. The combustion chamber has a combustion chamber length between a bulkhead and an outlet. The liner has a first portion and a second portion that extends in a substantially axial direction. A step connects the first portion and the second portion. The step is arranged at an angle to the second portion that is less than 90°. The first portion, second portion, and step are formed as a unitary ceramic component that extends at least 50% of the combustion chamber length.

In another embodiment according to any of the previous embodiments, the liner is a full hoop panel that extends circumferentially about the combustion chamber.

In another embodiment according to any of the previous embodiments, the liner comprises a plurality of liner panel segments arranged circumferentially about the combustion chamber.

In another embodiment according to any of the previous embodiments, the liner is arranged within a metallic outer shell.

In another embodiment according to any of the previous embodiments, the outer shell has a shell step arranged radially outward and axially upstream of the step.

In another embodiment according to any of the previous embodiments, a slot extends through the step.

In another embodiment according to any of the previous embodiments, a ratio of a height of the slot to a height of the step is greater than 0.66.

In another embodiment according to any of the previous embodiments, the step joins the second portion at a fillet. A step height is defined between the first portion and the second portion. A ratio of a radius of the fillet to the step height is between 0.3 and 0.5.

In another exemplary embodiment, a gas turbine engine includes a combustor section that has a plurality of combustor assemblies arranged circumferentially about an engine axis. At least one of the combustor assemblies has a liner panel arranged within a combustion chamber. The liner panel has a first portion and a second portion that extends in a substantially axial direction. A step connects the first portion and the second portion. The step joins the second portion at a fillet. A step height is defined between the first portion and the second portion. A ratio of a radius of the fillet to the step height is between 0.3 and 0.5. The liner panel is a ceramic matrix composite material.

In another embodiment according to any of the previous embodiments, the step is arranged at an angle to the second portion that is less than 90°.

In another embodiment according to any of the previous embodiments, a slot extends through the step and a ratio of a height of the slot to the step height is greater than 0.66.

In another embodiment according to any of the previous embodiments, the combustion chamber has an axial length between a bulkhead and an outlet, and the liner panel is formed as a unitary component that extends at least 50% of the combustion chamber length.

The present disclosure may include any one or more of the individual features disclosed above and/or below alone or in any combination thereof.

DETAILED DESCRIPTION

The present disclosure is directed to a ceramic combustor liner arrangement. Some known ceramic matrix composite (CMC) combustor liners experience high stresses on the part due to through-wall thickness temperature gradients. This high temperature gradient may limit the component life. The arrangement disclosed herein provides a combustor liner having a step, resulting in an axially longer combustor panel. The axially longer panel may provide part count and weight reductions. The step may also provide an opportunity for controlled cooling flow to the CMC liner, which may reduce the heat load on the CMC and reduce thermally induced stresses.

Figure 1:
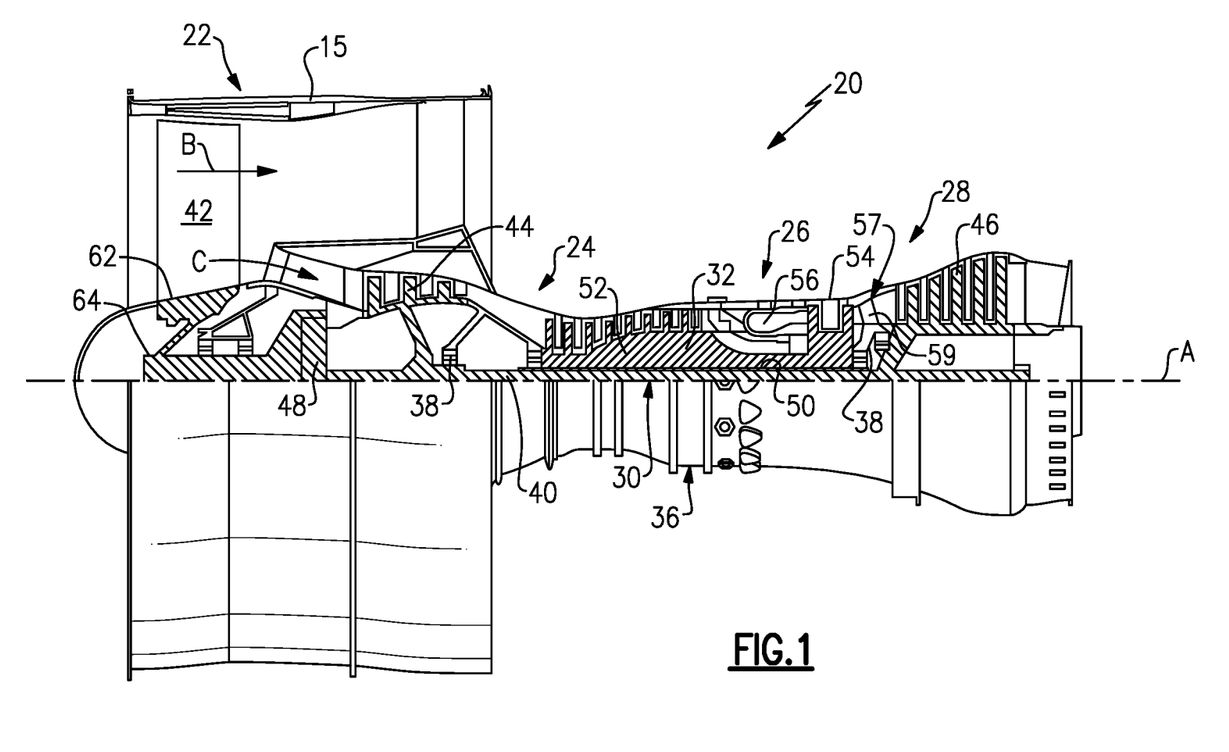
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
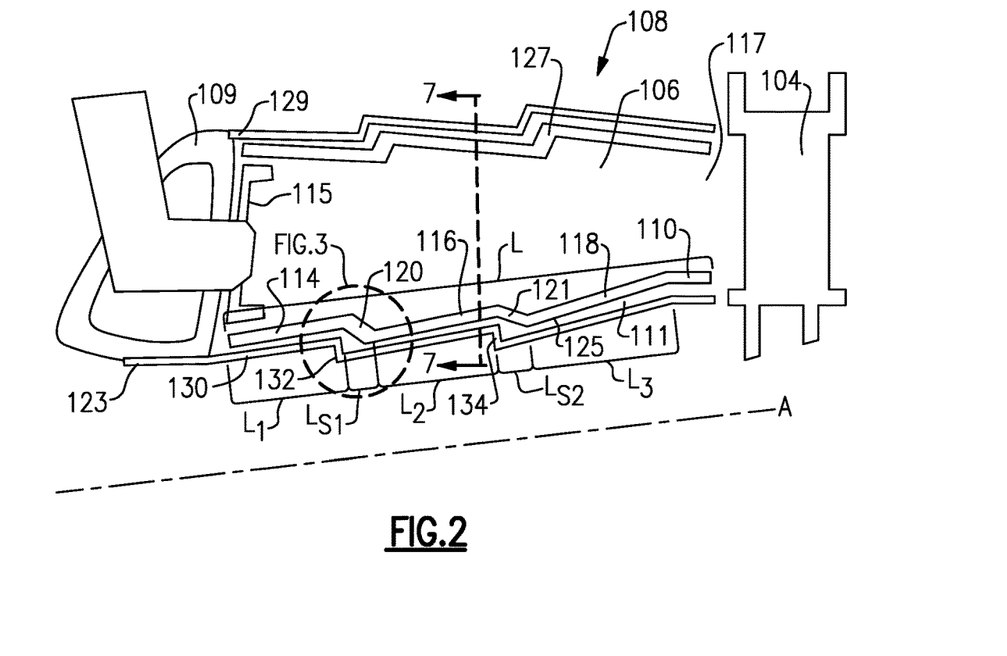
FIG. 2 schematically illustrates an example combustor assembly having a liner according to an embodiment.

FIG. 2 schematically illustrates a portion of an example combustor assembly 108. The combustor assembly 108 may be utilized in combustor section 26 of the engine 20 of FIG.

1, with products of combustion delivered to a turbine vane 104 of turbine section 28, for example. A combustor section 26 may include a plurality of combustor assemblies 108 disposed in an array about the engine axis A, each associated with a respective combustion chamber 106 that can have a substantially cylindrical profile, for example. Although the combustor assembly 108 is primarily discussed with respect to a turbofan gas turbine engine such as engine 20, other systems may also benefit from the teachings herein, including land-based and marine-based gas turbine engines.

The combustor assembly 108 includes a combustor liner 110 that surrounds the combustion chamber 106. The combustor liner 110 may be formed of a ceramic matrix composite ("CMC") material. For example, the liner 110 may be formed of a plurality of CMC laminate sheets. The laminate sheets may be silicon carbide fibers, formed into a braided or woven fabric in each layer. In other examples, the liner 110 may be made of a monolithic ceramic. CMC components such as the combustor liner 110 are formed by laying fiber material, such as laminate sheets or braids, in tooling, injecting a gaseous infiltrant into the tooling, and reacting to form a solid composite component. The component may be further processed by adding additional material to coat the laminate sheets. The liner 110 may be formed as a unitary ceramic component, for example. CMC components may have higher operating temperatures than components formed from other materials.

The combustor liner 110 has a stepped arrangement. The combustor liner 110 has a plurality of portions 114, 116, 118 that are joined by steps 120, 121. In one example, the portions 114, 116, 118 extend substantially axially, while the steps 120, 121 extend substantially radially relative to the engine axis A. In this disclosure, "generally axially" means a direction having a vector component in the axial direction that is greater than a vector component in the radial direction, and "generally radially" means a direction having a vector component in the radial direction that is greater than a vector component in the axial direction. In this example, the portions 114, 116, 118 are shown on a radially inner portion 125 of the liner 110. However, a radially outer portion 127 may also have a plurality of portions and steps. Although the combustor liner 110 is shown and described relative to an engine axis A, in other example combustor assemblies 108, the liner panel arrangement may be relative to a combustor axis, depending on the engine arrangement.

In this example, the first portion 114 has a first length $L_1$, the second portion 116 has a second length $L_2$, and the third portion has a third length $L_3$. In this example, the first, second, and third lengths are measured in the substantially axial direction relative to the engine axis A. In other examples, the lengths may be taken relative to a combustor axis, for example. The step 120 has a length $L_{S1}$. Each of the first, second, and third lengths $L_1$, $L_2$, $L_3$ is longer than the length $L_{S1}$ of the step 120. In one example, the first and second lengths $L_1$, $L_2$ are more than twice as long as the step length $L_{S1}$. The second step 121 has a length $L_{S2}$. In some examples, the length $L_{S1}$ may be different from the length $L_{S2}$, or the step lengths $L_{S1}$, $L_{S2}$ may be the same as one another. The liner panel 110 has a total length L in the axial direction. The length L of the liner panel 110 may be at least 50% of a combustion chamber length from a bulkhead 115 to an outlet 117. In a further embodiment, the length L of the liner panel 110 extends the entire length of the combustion chamber 106 from the bulkhead 115 to the outlet 117. That is, the liner 110 is formed as a single unitary body that extends most of the length L of the combustion chamber.

In this example, the liner 110 is arranged within an outer shell 130. The outer shell 130 has a plurality of steps 132, 134 arranged adjacent the steps 120, 121 of the liner 110. In the illustrated example, the step 120 of the liner 110 is arranged downstream of the step 132 in the outer shell 130. In another example, the step 120 and the step 132 overlap in the axial direction. In some examples, the steps 132, 134 of the outer shell 130 may have a different angle from the steps 120, 121 of the liner 110. The outer shell 130 may be a metallic material, for example. A gap 111 is defined between the liner 110 and the outer shell 130. In some examples, cooling air may flow through the liner 110 between the gap 111 and the combustion chamber 106. In this example, the outer shell 130 is secured to a dome assembly 109 at forward attachment points 123, 129. The liner 110 may be secured to the outer shell 130, for example. In other examples, different attachment arrangements may be used.

Figure 3:
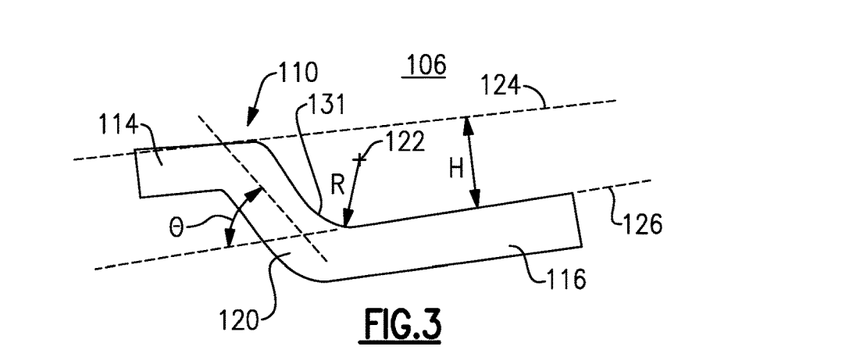
FIG. 3 schematically illustrates a portion of the example combustor liner.

FIG. 3 illustrates a portion of the example combustor section 26 of FIG. 2. Although the example step 120 is shown, this step arrangement may apply to any of the steps 120, 121 of the combustor liner 110 and on the inner or outer portions 125, 127 of the liner 110. This stepped arrangement results in an axially longer combustor panel than known combustor liners.

The first portion 114 defines a first tangential line 124 and the second portion 116 defines a second tangential line 126. A step height H is defined between the first and second tangential lines 124, 126. The step 120 extends substantially at an angle θ relative to the second tangential line 126. The angle θ may be less than 90°, for example. The step 120 joins the second portion 116 at a fillet 131. The fillet 131 has a radius R relative to a point 122 within the combustion chamber 106. In one example, a ratio of the radius R to the step height H is between about 0.3 and about 0.5. The angle θ and fillet 131 may help prevent sharp edges along the liner 110.

Figure 4:
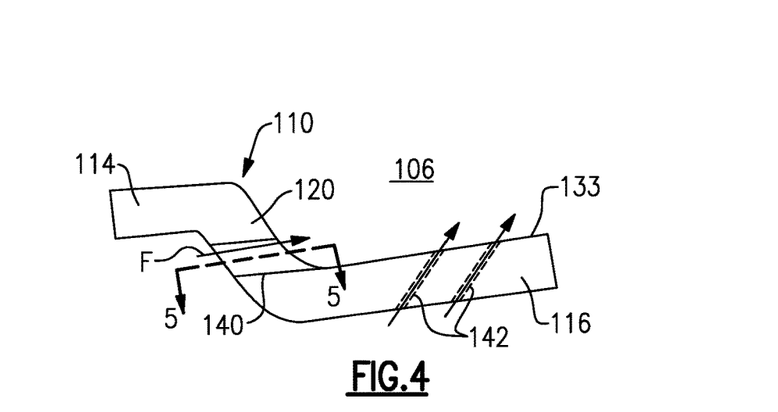
FIG. 4 schematically illustrates a portion of the example combustor liner.

FIG. 4 illustrates another view of the portion of the example combustor section 26 of FIG. 2. In this view, a cooling slot 140 extends through the step 120. Cooling flow F flows through the slot 140 in a direction substantially parallel with the tangential line 126 (shown in FIG. 3). In other words, the slot 140 is positioned tangentially to the downstream surface 133. This cooling flow cools the inner surface 133 of the liner 110. The cooling slots 140 may be formed via ultrasonic machining, laser, or water-guided laser jet, for example. In another example, the cooling slots 140 are formed along with the liner 110 by using carbon rods in the preform resulting in slots 140 after densification. The step 120 may have a plurality of slots 140 spaced circumferentially about the chamber 106. The slots 140 may be arranged in a single row along the step 120, for example. In some examples, effusion holes 142 may extend through the portion 116. The effusion holes 142 may provide enhanced cooling film effectiveness in some examples.

Figure 5:
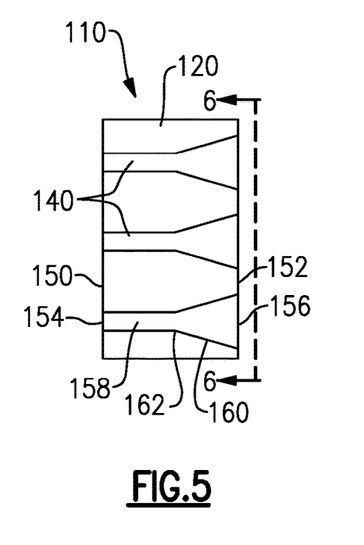
FIG. 5 schematically illustrates a sectional view of the portion of the example combustor liner along the line 5-5 of FIG. 4.

FIG. 5 illustrates a sectional view of the step 120 along the line 5-5 of FIG. 4. Each of the slots 140 extends between an inlet 154 in a cold surface 150 and an outlet 156 in a hot surface 152 within the chamber 106. In some examples, the slot 140 has a straight portion 158 having a constant hydraulic diameter and a diffuser portion 160 that increases in hydraulic diameter towards the outlet 156. In this example, the straight portion 158 meets the diffuser portion 160 at a point 162 that is between the cold and hot surfaces 150, 152. In this example, the point 162 is between 10% and 90% of the distance between the cold and hot surfaces 150, 152. The diffuser portion 160 helps to spread cooling air to enhance film coverage on the hot surface 152 of the liner 110. In other examples, the slot 140 may have a constant hydraulic diameter or constant cross-section from the inlet 154 to the outlet 156.

Figure 6A:
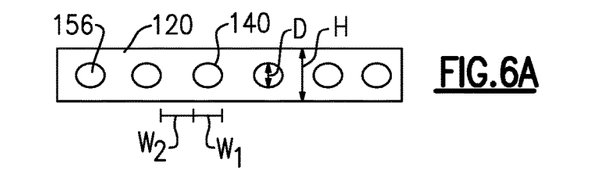
FIG. 6A schematically illustrates an example embodiment of the portion of the combustor liner along the line 6-6 of FIG. 5.

FIGS. 6A-6D illustrate example embodiments of the step 120 viewed along the line 6-6 of FIG. 5. As shown in FIG. 6A, each of the slots 140 may have a substantially circular outlet 156. In this example, each slot 140 has a height or diameter D. In one example, a ratio of the diameter D to the step height H may be at least 0.66. In a further example, the ratio of diameter D to step height H may be at least 0.75. The slot 140 may have a width $W_1$. A distance $W_2$ is defined between adjacent slots 140. A ratio of the widths $W_1$ to $W_2$ may be greater than about 0.5, for example. In a further example, the ratio $W_1$ to $W_2$ may be greater than 2. However, this ratio may vary, depending on the particular cooling needs.

Figure 6B:
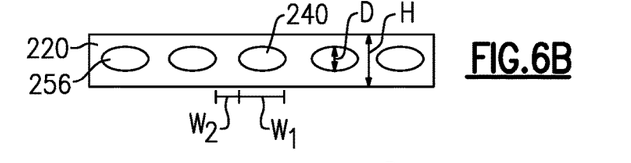
FIG. 6B schematically illustrates an example embodiment of the portion of the combustor liner along the line 6-6 of FIG. 5.
Figure 6C:
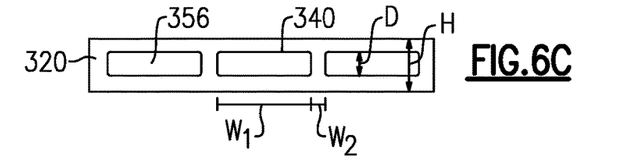
FIG. 6C schematically illustrates an example embodiment of the portion of the combustor liner along the line 6-6 of FIG. 5.
Figure 6D:
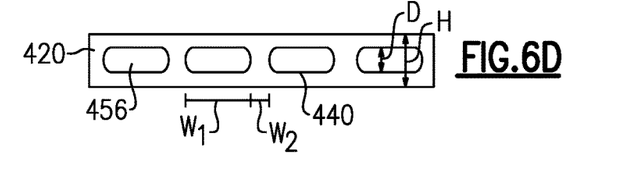
FIG. 6D schematically illustrates an example embodiment of the portion of the combustor liner along the line 6-6 of FIG. 5.

FIG. 6B illustrates another example step 220. In this example, the slot 240 has an outlet 256 that is substantially oval. In these examples, the dimension D is a height of the slot 240. In the example step 320 of FIG. 6C, the slot 340 has an outlet 356 that is substantially rectangular. In the example step 420 of FIG. 6D, the slot 440 has an outlet 456 that is substantially racetrack shaped. Although each of these examples shows a single shape extending along the step 120, 220, 320, 420, in other embodiments, multiple shapes may alternate along the step 120, 220, 320, 420 about the circumference of the liner 110. The slots 140, 240, 340, 440 may provide control of cooling flow F flowing between the gap 111 and the combustion chamber 106.

Figure 7A:
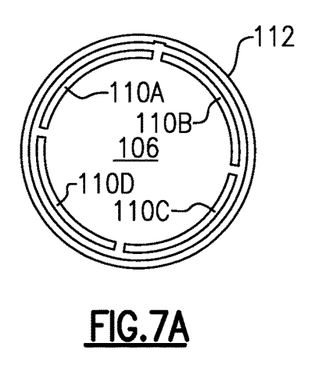
FIG. 7A schematically illustrates a cross-sectional view of an example embodiment of the combustor assembly taken along line 7-7 of FIG. 2.
Figure 7B:
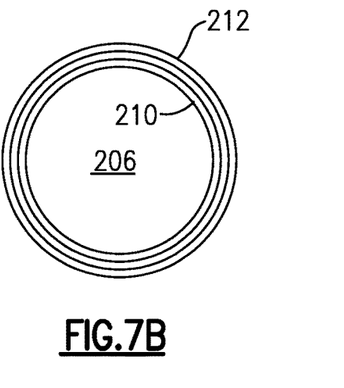
FIG. 7B schematically illustrates a cross-sectional view of an example embodiment of the combustor assembly taken along line 7-7 of FIG. 2.

FIGS. 7A-7B illustrate cross-sectional views of example embodiments of the combustor assembly 108 taken along line 7-7 of FIG. 2. As shown in FIG. 7A, the liner 110 may be segmented into a plurality of panel segments 110A, 110B, 110C, 110D arranged about the chamber 106 and within the outer shell 112. Although four segments 110A, 110B, 110C, 110D are illustrated, more or fewer segments may be used. For example, the combustor assembly 108 may 10 or fewer segments 110.

FIG. 7B illustrates an example combustor assembly taken along line 7-7 of FIG. 2. In this example, the liner panel 210 is a full hoop. That is, the liner 210 is a single piece that extends circumferentially about the chamber 206 within the outer shell 212.

Figure 8:
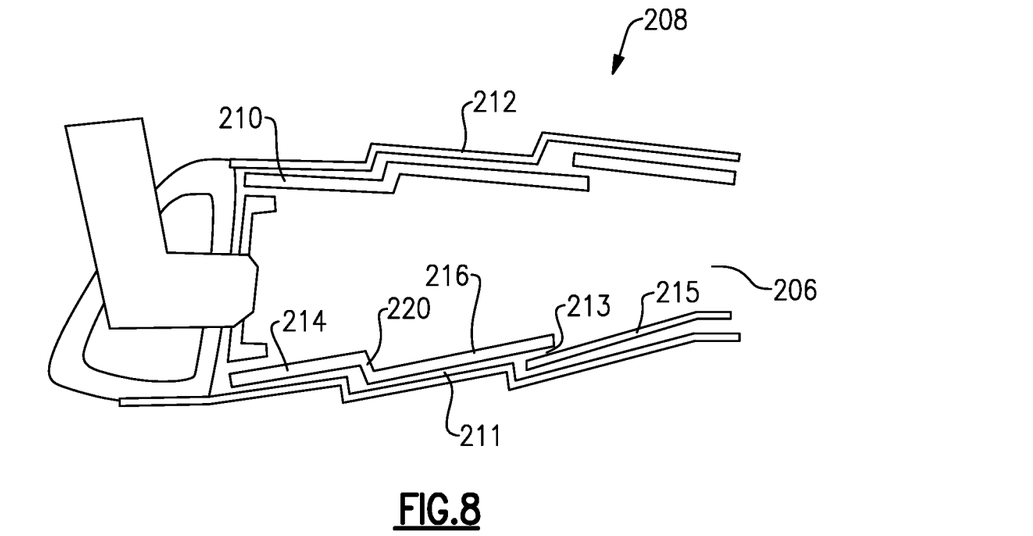
FIG. 8 schematically illustrates an example combustor assembly according to another embodiment.

FIG. 8 illustrates another example combustor liner 210 according to an embodiment. In this example, the combustor liner 210 has a single step 220, and is used in combination with another separate combustor liner 215. A space 213 is formed between the combustor liners 210, 215. In other words, the combustor assembly may have a liner that is split into multiple combustor liner panels 210, 215 in the axial direction. Although two and three stepped combustor liners 110, 210 are shown, liners having additional steps may fall within the scope of this disclosure. For example, the combustor liner 210 may have 6 steps or fewer. Further, the combustor may have a liner that is split in other places along the length of the combustion chamber.

Figure 9:
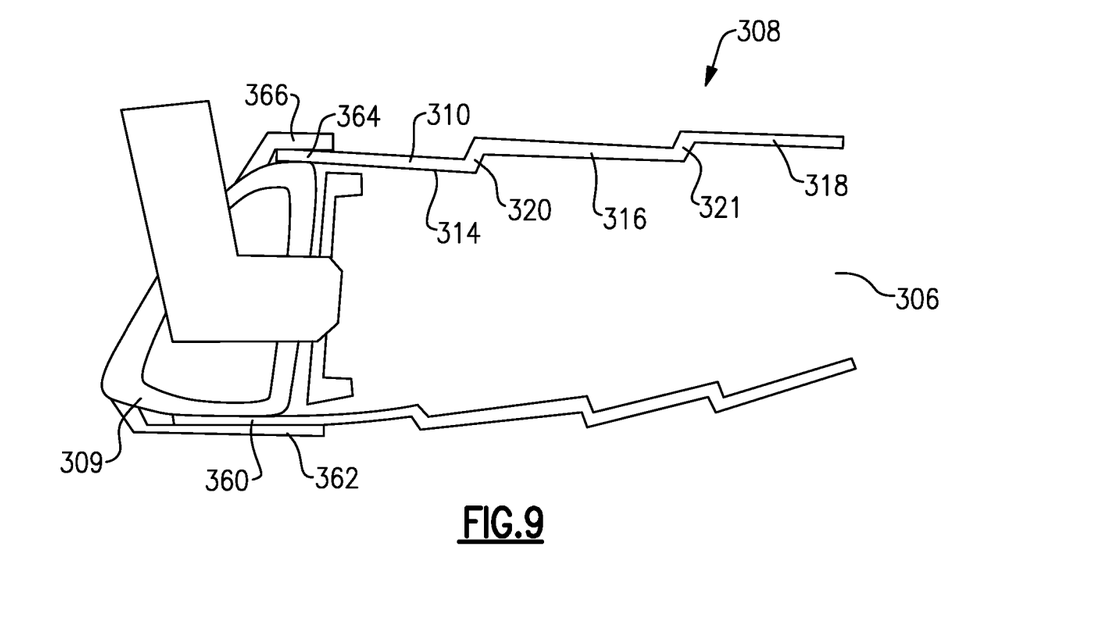
FIG. 9 schematically illustrates an example combustor assembly according to another embodiment.

FIG. 9 schematically illustrates another example combustor assembly 308 according to an embodiment. In this example, the combustor liner 310 is not arranged within an outer shell, and thus the combustion chamber 306 has a single wall. In this example, the liner 310 has ends 360, 364 that are in engagement with portions 362, 366, respectively of the dome assembly 309. Although a particular mounting arrangement is shown, other arrangements may be used. This single walled arrangement may be used in combustor sections with lower coldside impingement cooling needs. The combustor liner 310 may provide weight savings compared to other arrangements, in some examples.

The stepped liner arrangement provides an axially longer combustor liner, which may reduce weight, part count, and cooling flow requirements. The CMC material of the example liner 110 has a higher maximum use temperature than many known metallic materials. However, CMC cannot tolerate the same levels of thermal gradient and strain. For example, through-wall thickness gradients may raise stresses on the part and any environmental barrier coating (EBC). The slot film cooling provides greater control over cooling flow. This cooling arrangement may improve the lifespan of the CMC and EBC of the liner 110 by reducing external heat load onto the CMC and reducing thermally induced stresses.

In this disclosure, "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A combustor liner, comprising:
a first portion extending in a substantially axial direction;
a second portion extending in the substantially axial direction, the first portion axially forward of the second portion;
a step connecting the first portion and the second portion, the step arranged at an angle to the second portion that is less than 90° such that the step slants axially forward from the second portion to the first portion, the step having a step height defined as a distance between the first portion and the second portion, wherein and the first portion, second portion, and step are formed as a unitary ceramic component, wherein the step joins to the first portion at a first fillet and joins to the second portion at a second fillet, the first and second fillets arranged on surfaces of the combustor liner configured to face into a combustion chamber;
a first slot extending through the step, and wherein a ratio of a height of the first slot to the step height is greater than 0.66; and
a second slot extending through the step, and wherein a ratio of a width of the first and second slots to a distance between the first and second slots is greater than 0.5.

2. The combustor liner as recited in claim 1, wherein a ratio of a radius of the second fillet to the step height is between 0.3 and 0.5.

3. The combustor liner as recited in claim 1, wherein the slot extends substantially tangentially to the second portion.

4. The combustor liner as recited in claim 1, wherein the slot has a diffuser portion.

5. The combustor liner as recited in claim 1, wherein at least one hole extends through the second portion.

6. The combustor liner as recited in claim 1, wherein a third portion is joined to the second portion at a second step.

7. The combustor liner as recited in claim 1, wherein the first portion has a first length, the second portion has a second length, and the step has a step length, and wherein the first length and the second length are at least twice the step length.

8. The combustor liner as recited in claim 1, wherein the slot includes an outlet, the outlet including a perimeter with at least one curve.

9. A combustor assembly, comprising:
- a combustion chamber having a combustion chamber length between a bulkhead and an outlet;
- a liner arranged within the combustion chamber, the liner including:
  - a first portion and a second portion extending in a substantially axial direction, the first portion axially forward of the second portion, and
  - a step connecting the first portion and the second portion, the step arranged at an angle to the second portion that is less than 90° such that the step slants axially forward from the second portion to the first portion;
- wherein the step joins to the first portion at a first fillet and joins to the second portion at a second fillet, the first and second fillets arranged on surfaces of the liner facing into the combustion chamber;
- wherein the first portion, second portion, and step are formed as a unitary ceramic component that extends at least 50% of the combustion chamber length; and
- wherein a step height is defined between the first portion and the second portion and a ratio of a radius of the second fillet to the step height is between 0.3 and 0.5.

10. The combustor assembly of claim 9, wherein the liner is a full hoop panel extending circumferentially about the combustion chamber.

11. The combustor assembly of claim 9, wherein the liner comprises a plurality of liner panel segments arranged circumferentially about the combustion chamber.

12. The combustor assembly of claim 9, wherein the liner is arranged within a metallic outer shell.

13. The combustor assembly of claim 12, wherein the outer shell has a shell step arranged radially outward and axially upstream of the step.

14. The combustor assembly of claim 9, wherein a slot extends through the step.

15. The combustor assembly of claim 14, wherein a ratio of a height of the slot to a height of the step is greater than 0.66.

16. A gas turbine engine, comprising:
- a combustor section having a plurality of combustor assemblies arranged circumferentially about an engine axis;
- at least one of the combustor assemblies having a liner panel arranged within a combustion chamber, the liner panel including:
  - a first portion and a second portion extending in a substantially axial direction, the first portion axially forward of the second portion, and
  - a step connecting the first portion and the second portion, the step arranged at an angle to the second portion that is less than 90° such that the step slants axially forward from the second portion to the first portion, the step joining to the first portion at a first fillet and joining to the second portion at a second fillet, the first and second fillets arranged on surfaces of the liner panel facing into the combustion chamber;
  - wherein a step height is defined between the first portion and the second portion, and a ratio of a radius of the second fillet to the step height is between 0.3 and 0.5; and
  - wherein the liner panel is a ceramic matrix composite material.

17. The gas turbine engine of claim 16, wherein a slot extends through the step, and wherein a ratio of a height of the slot to the step height is greater than 0.66.

18. The gas turbine engine of claim 16, wherein the combustion chamber has an axial length between a bulkhead and an outlet, and the liner panel is formed as a unitary component that extends at least 50% of the combustion chamber length.

\* \* \* \* \*